Dec. 30, 1941. T. J. GORMAN, JR 2,268,117
MACHINE FOR AFFIXING AND FASTENING BAILS TO CANS
Filed Feb. 19, 1940 6 Sheets-Sheet 4
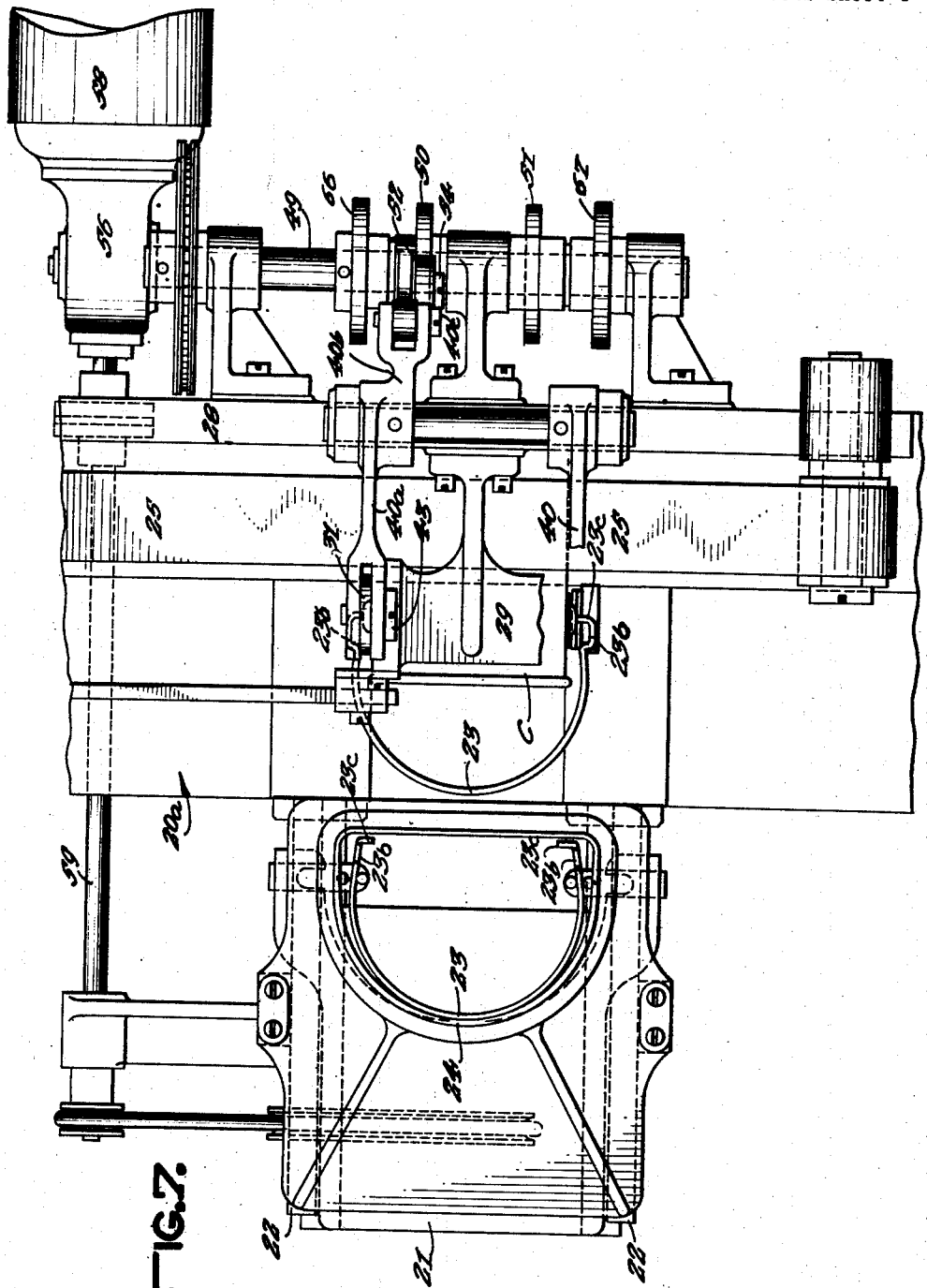
INVENTOR.
Thomas J. Gorman Jr.

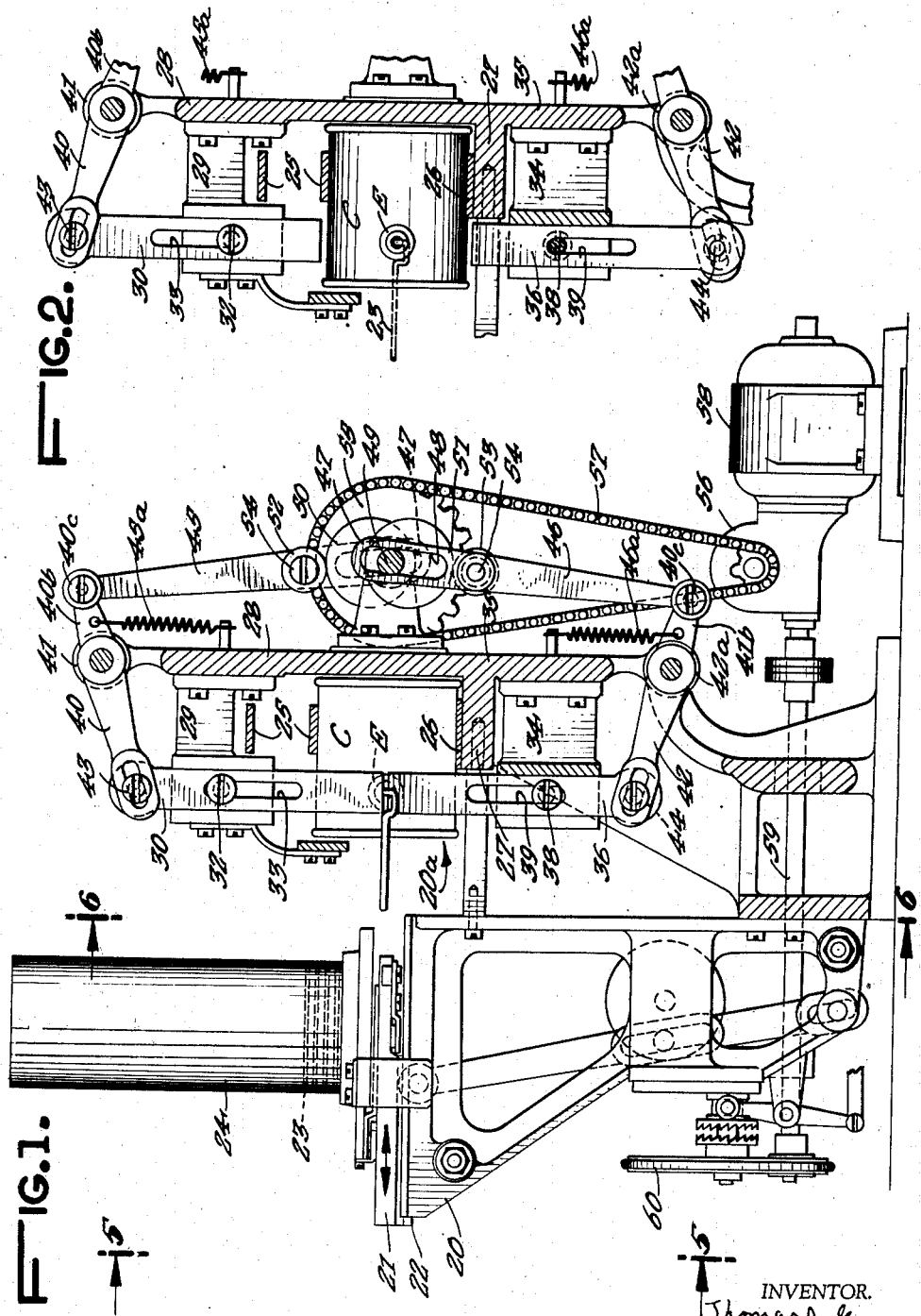

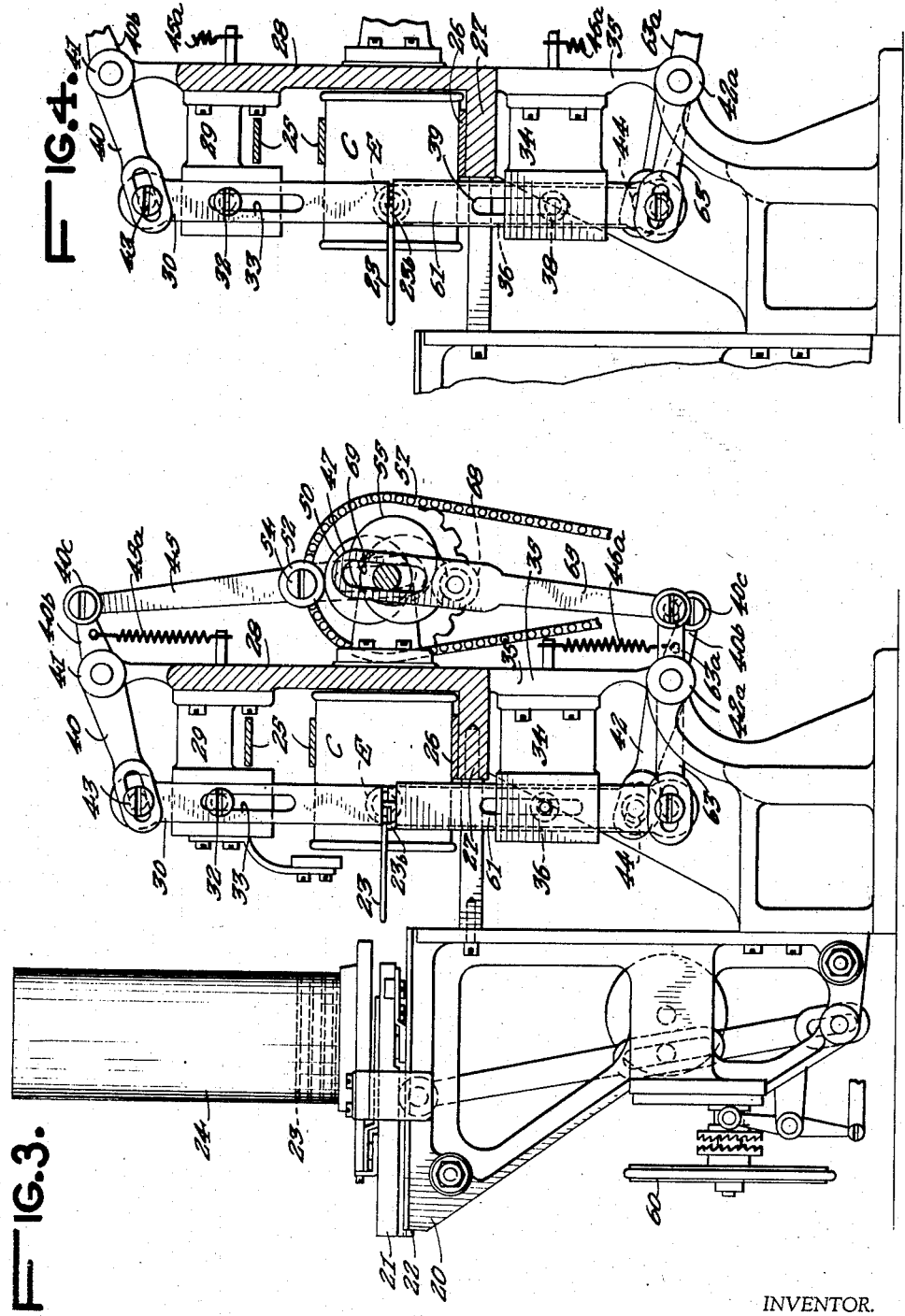

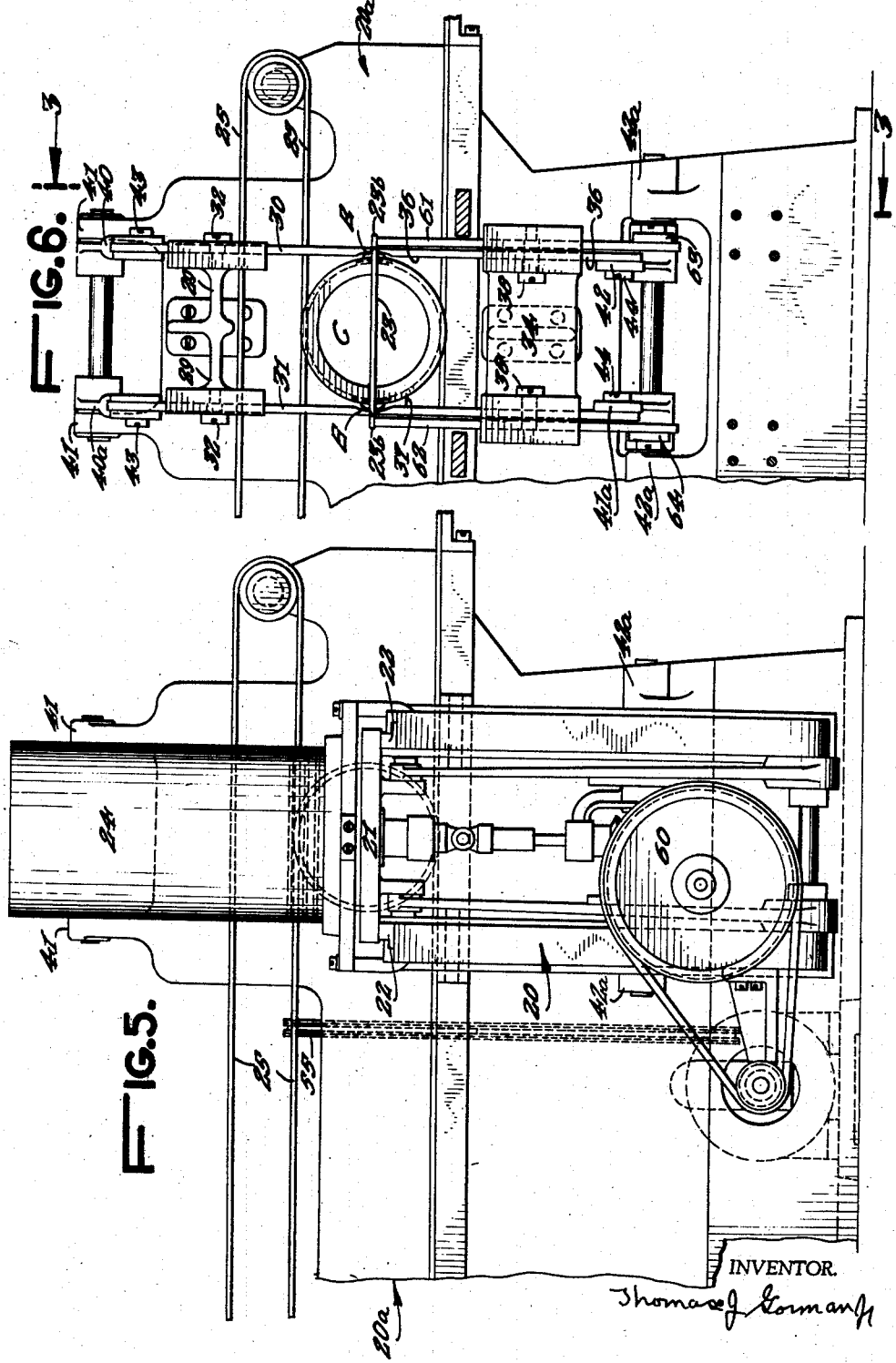

Dec. 30, 1941.   T. J. GORMAN, JR   2,268,117
MACHINE FOR AFFIXING AND FASTENING BAILS TO CANS
Filed Feb. 19, 1940   6 Sheets-Sheet 5
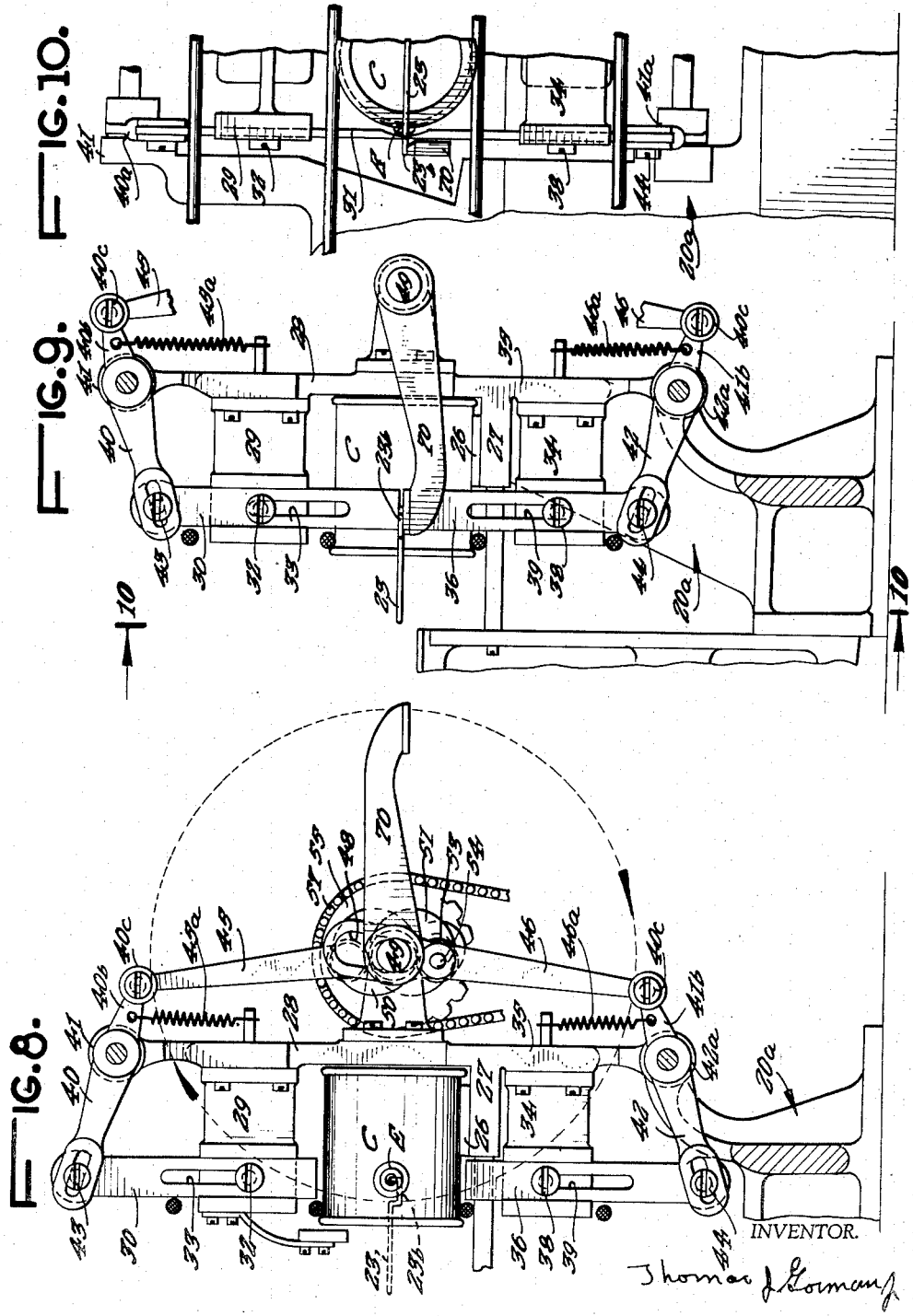
INVENTOR.
Thomas J. Gorman Jr.

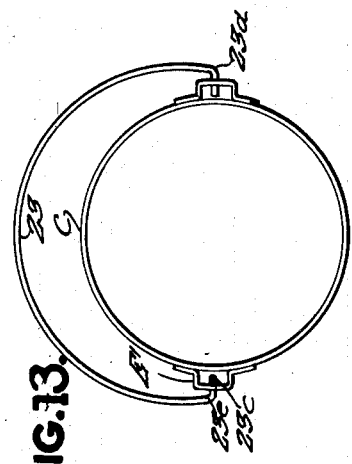
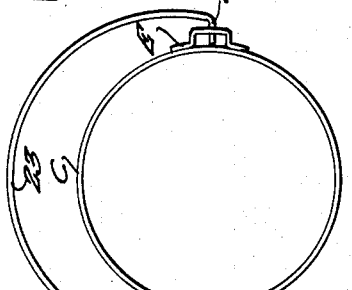
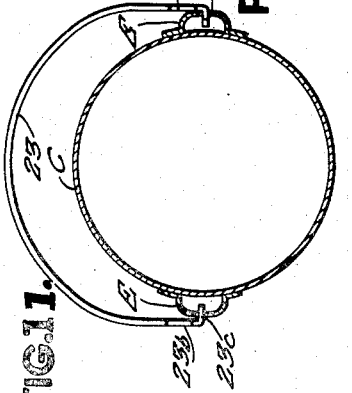
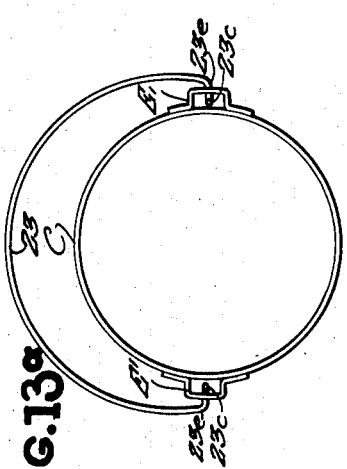
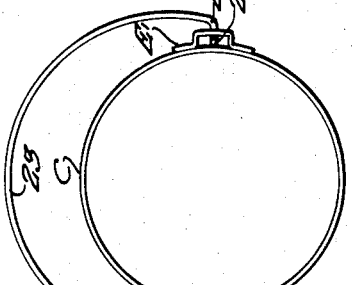
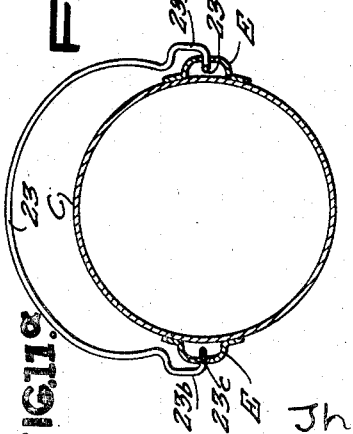
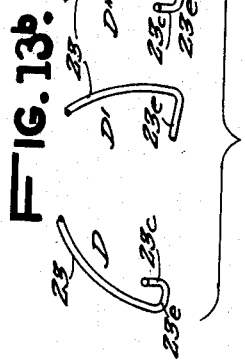
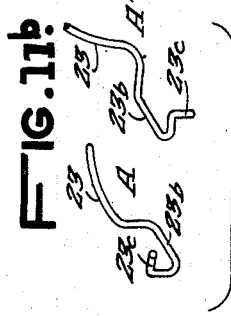

Patented Dec. 30, 1941

2,268,117

UNITED STATES PATENT OFFICE 2,268,117

MACHINE FOR AFFIXING AND FASTENING BAILS TO CANS

Thomas J. Gorman, Jr., Newark, N. J.

Application February 19, 1940, Serial No. 319,585

4 Claims. (Cl. 140—93)

This invention relates to the types of machines for affixing bails or handles upon cans and especially to machines of this type which will affix said bails or handles automatically on cans while the cans are delivered to the machine by hand, continuous belt or the like. This invention also represents a further improvement on my Patent #2,154,071.

The bails commonly used in the past have required insertion of the ends of the bail into the bail ears by hand. Though formed to prevent withdrawal of said ends after they were inserted, this forming of the bail end by hand not only was a difficult hand operation but it also required difficult bail manipulation to insert the bail into the ears, of the can. In addition, due to excessive bail manipulation, the bail ends were slightly bent or formed out of their original position so that under heavy load the bail would bend and come off the ears, of the can. The time required for placing this type of bails upon cans was too excessive for efficient can production. My invention renders possible to eliminate all the above disadvantages. My automatic bail affixing machine eliminates expensive hand manipulation for affixing the bails by hand and it also fastens said bails upon the cans in a manner as to provide a permanent hold upon the ears of the can.

Another object of this invention is to provide an automatic machine for placing or affixing bails upon cans said machine having means for storing bails and selecting from said stored group of bails one bail at a time and affixing the same upon a can.

A further object of this invention is to provide an automatic bail forming and bail affixing machine for the purpose of producing and affixing said bails on a can or the like.

A further object of this invention is to provide an automatic bail affixing machine which will affix and fasten said bails upon the can.

A further object of this invention is to provide a specially constructed bail for said automatic bail placing or affixing machine.

A further object of this invention is to provide an automatic bail affixing machine said machine having means for fastening said bails to cans or the like.

Other objects and advantages of my invention will be seen from the following description, in connection with the accompanying drawings disclosing a preferred embodiment thereof.

Referring to the drawings:

Fig. 1 is a sideview of the machine showing the arrangement for delivering the cans to the bail affixing machine also the arrangement for affixing said bail to the can and holding the bail ends in place preliminary to bending operation.

Fig. 2 is a detailed side view of the machine showing the bail end holding members or bars raised for the purpose of allowing a new can to be moved into position for affixing a bail.

Fig. 3 is a section on the line 3—3 of Fig. 6, showing the means used for holding the bail ends in place and for bending the same. This is the position of parts of the machine preliminary to bending the bail ends.

Fig. 4 is a detailed view of the machine showing the position of parts after the bail ends have been bent.

Fig. 5 is showing the front view of the machine as seen from the lines 5—5 of Fig. 1.

Fig. 6 is a section taken on the line 6—6 of Fig. 1, showing the parts of the machine used for holding the bail ends and for bending the bail. The position of the parts shown, is preliminary to bending the bail ends.

Fig. 7 is an enlarged plan view of the machine showing the bail basket or housing and the parts of the machine used to operate the bail end holding and bending members which are shown partly in section.

Fig. 8 is illustrating a modification of the machine shown in Fig. 1. In this case the bail end bending members or bars are operated in a rotative movement instead of vertically as it is the case in the machine shown in Fig. 1. In this figure the bail end bending member is shown preliminary to bending the bail.

Fig. 9 is a partial view of the machine shown in Fig. 8, showing the position of the bail end bending member after the bail end has been bent.

Fig. 10 is a view taken on the line 10—10 of Fig. 9, showing the relation of parts used for bending the bail ends.

Fig. 11 illustrates a can with closed ears and the bail affixed to it preliminary to bending the bail ends.

Fig. 11a illustrates the bail shown in Fig. 11 after the bail ends have been bent by the machine.

Fig. 11b illustrates a perspective view of the bail end of the bail shown in Fig. 11 before the bail end has been bent and after the bail end bend operation.

Fig. 12 illustrates a can having open ears thereon and a bail affixed to said ears in position and before the bail end bend operation.

Fig. 12a illustrates the condition of the bail shown in Fig. 12 after the bail end bend operation.

Fig. 12b illustrates a perspective view of the bail shown in Fig. 12 before the bail end bend operation and after.

Fig. 13 illustrates a can and a bail affixed to it, said bail having one bail end bent before being affixed to said can. The bent bail end is affixed to the can manually before said can being placed on the machine, the other bail end is bent automatically by the machine.

Fig. 13a illustrates the condition of the bail end shown in Fig. 13 after bending.

Fig. 13b is a perspective view of the bent bail end shown in Fig. 13, and the straight bail end before being bent and after the bending operation.

Fig. 14 is a perspective view of an open ear as used in connection with the bail end and can as shown in Figs. 12 to 12b and 13 to 13b.

In reference to Fig. 1, 20 represents the frame of the bail affixing machine proper. The operation of this machine is substantially the same as described in my Patent No. 2,154,071.

A slidably mounted table 21 is slidably movable in the slide ways 22 which are located in the frame 20. The table 21 is reciprocally moved in the direction indicated by the arrow. A group of bails 23 are housed in a basket 24 which is held above the table 21. One bail at a time is delivered to the sliding table 21 from the basket 24, and is affixed to the ears E of the can C. (For further description of the operation of the bail affixing machine see the specification of my Patent No. 2,154,071.)

The can C is delivered to the bail affixing machine 20 through an endless belt 25. The cans C roll on a mat 26 located on the bed shelf 27 of the bail fastening machine 20a. An upward extension member 28 of the bed 26 supports a supporting casting 29 which serves as a support to a slidably mounted bar 30. A bar 31 similar to the bar 30 is mounted on the opposite side of the supporting casting 29. The bars 30 and 31 are held to the casting 29 by the bolts 32. The bolts 32 are fitted into slots 33 located on the bars 30 and 31.

Another supporting casting 34 is likewise fastened to the downward extension 35 of the bed 26. A pair of sliding bars 36 and 37 similar to the bars 30 and 31 are slidably mounted upon the supporting casting 34. The bars 36 and 37 are held to the casting 34 by bolts 38 which are fitted into slots 39 located on the bars 36 and 37.

A hingeably mounted arm 40 is hingeably mounted at the bearing 41 at the upper portion of the extension 28. An arm 42 similar to the arm 41 is hingeably attached to a bearing 42a located at the lower extension 35. The arm 40 is attached by a bolt 43 to the slidably movable bar 30. Likewise the arm 42 is attached to the slidably movable bar 36 by a bolt 44. A pair of arms 40a and 41a are attached to the sliding bars 31 and 37 respectively. The arms 40a also the arm 41a have extension arms 40b and 41b which are attached by bolts 40c to the operating bars 45 and 46, respectively. The other end of the operating bars 45 and 46 has a slot 48. An operating shaft 49 which carries a set of excentric cams 50 and 51 passes through the slots 48 of the operating arms 45 and 46. The excentric cams 50 and 51 contact rollers 52 and 53. The rollers 52 and 53 are rotatably attached to the operating arms 45 and 46 by the bolts 54. A spoked wheel 55 is also fastened to the operating shaft 49 and is operated by a chain drive 56 and a chain 57. The chain drive 56 is rotated by an electric motor 58. The motor 58 also operates the bail affixing machine 20 by an extension shaft 59 which rotates a belt operated pulley 60. The pulley 60 operates the mechanism of the bail affixing machine 20. Both machines, the bail affixing machine 20 and the bail fastening machine 20a, are timed in such a manner as to operate in unison. A pair of secondary bars 61 and 62 are slidably mounted to the supporting casting 34. The bars 61 and 62 are attached to a pair of hingeably mounted arms 63 and 64 which are hinged at the bearing 42a. The opposite ends 63a and 64a of the arms 63 and 64 are attached to a pair of arms 65 which are of a similar construction with the arms 45 and 46. A secondary pair of excentric cams 66 and 67 are in contact with the rollers 68 which are attached to the arms 65. The operating arms 65 also have slots 69 to allow the passage of the operating shaft 49. The excentric cams 66 and 67 are attached to the operating shaft 49.

Figs. 8, 9 and 10 illustrate a modification of the machine shown in Figs. 1 to 7. The machine shown in Fig. 8, differentiates from the above described in that it employs a rotating arm for bending the ends of the bails 23 instead of slidable arms 61 and 62 as shown in Fig. 6. The rotating arm 70 is attached to the operating shaft 49. When the holding arms 30 and 31 are in position to hold the bail 23 in place the rotating arm 70 will just contact the end 23c of the bail and begins to bend same. As the rotation of the rotating arm 70 continues and comes in the position shown in Figs. 9 and 10 it automatically moves sideways to clear the end of the bail. At further rotation of the operating shaft 49 and the rotating arm 70 respectively, the arm 70 will return to its original position as shown in Fig. 8.

Fig. 11 illustrates one form of wire bail which can be used in connection with the wire affixing and bending machine 20 and 20a. Fig. 11 illustrates the condition of the bail at the time it has been affixed by the machine 20 to the can C. In Fig. 11a it is shown the final form of the bail 23 after the ends of the bail have been bent by the bending machine 20a. Fig. 11b illustrates a perspective view of the ends of the bail: A before it has been formed and A[1] after the bending operation.

Fig. 12 illustrates another form of the wire bail used in connection with the machine 20 and 20a. Fig. 12 shows the condition of the bail after being affixed to the ears E of the can C. Fig. 12a is showing the condition of the ends of the bail after the bending operation. Fig. 12b is illustrating a perspective view of the end of the bail B before the bending operation and B[1] after it has been bent.

Fig. 13 illustrates a further form of wire bail. In this case one end 23c of the bail 23 is bent beforehand. The end 23c of the bail 23 is therefore manually affixed to the ear E of the can C. The straight end 23d of the bail 23 is thereafter inserted into the other ear E[1] of the can C. Both of these operations are done manually, whereupon the can C is placed under the endless belt 25 of the bail end bending machine 20a for the purpose of bending the straight end 23d of the bail 23.

Fig. 13a illustrates the condition of both bail ends of the bail 23 after the bending of the bail end 23d by the machine 20a.

Fig. 13b is a perspective view of the ends of the bail 23. D illustrates the condition of the bent end 23e of the bail 23, D¹ illustrates the condition of the straight end 23d of the bail 23 and D¹¹ illustrates the condition of the straight end 23d after bending.

Operation

The machine as shown in Figs. 1 to 7, consists of a combination of a bail affixing machine 20 and a bail end bending machine 20a. The bails 23 which are to be affixed to the cans are stored in the housing 24. These bails are automatically delivered to the reciprocating table 21 which is operated by means of the mechanism contained in the bail affixing machine 20. The operation of the bail affixing machine 20 has been lengthily described in my Patent No. 2,154,071.

Differentiating from the form of bails used in my Patent No. 2,154,071 which bails have a bail end comprising of a hook said hook formed horizontally in respect to the rest of the bail proper, in the present invention the hooked ends of the bail are perpendicular to the rest of the bail (see Fig. 11b—A). Although the construction of the new bail is different from the old one the same bail affixing machine can be used in this new invention as in my Patent No. 2,154,071.

While the bail 23 has been affixed to the ears E of the can C (see Fig. 2) the bail end holding bars 30 and 36 have been automatically moved into position shown in Fig. 1 from their former position shown in Fig. 2. This operation is accomplished by the rotation of the cams 50 and 51 which are fastened and rotated by the shaft 49. The cams 50 and 51 are in contact with the rollers 52 and 53 so that as the cams rotate the operating arms 45—46 are moved against the pressure of the springs 45a—46a. The operating arms 45 and 46 rock the hinging arms 40 and 42 which in turn slide the bail end holding bars 30 and 36 against the bail end of the bail 23.

While this operation has been taking place a secondary pair of sliding bars 61 and 62 which are located side by side with the bail end holding bars 36 and 37 has been moved into position shown in Fig. 3. In this position the ends of the secondary arms 61 and 62 just touch the hooked bail end 23b. The further upward movement of the secondary or bending bars 61 and 62 turns the hooked or U-shaped bail end 23b to a horizontal position in respect to the rest of the bail 23.

As the bail 23 has been formed beforehand with a bent end portion 23c which is positioned vertically in respect to the U-shaped bail end 23b of the bail 23, the operation of turning up the U-shaped end 23b of the bail twists the bail end 23e. The bail end 23e is in this instance already placed inside the ear E. The result is that while at first the bail end 23e has been just inside the ear E now it is bent around 90 degrees inside said ear E. This new position of the bail end 23e will permanently prevent it from coming off the ear E of the can C.

After the bail end 23c has been bent the bail holding bars 30, 31, 36 and 37 are automatically retracted. Likewise the bail bending bars or secondary bars 61 and 62. The can C is moved off the bed 27 of the machine by the endless belt 25 and the machine is now ready to receive a new can and to affix another bail to the ears of said new can.

Now, having described my invention what I claim is:

1. In a machine for affixing bails and for permanently securing said bails upon cans or the like containers, said machine including a machine for affixing said bails upon said cans, and a machine for securing said bails upon said cans, said machine for affixing said bails upon said cans having means therein for storing a plurality of said bails, and means for releasing and delivering one of said bails at a time to a reciprocally operated arm means for affixing said bail upon said can; said means for permanently securing said bail upon said can including slidable arm means for holding said bail in position after said bail has been affixed upon said can, and slidable arm means for twisting the bail, the twisting operation of said arm means upon said bail end permanently securing said bail upon said can as set forth.

2. In a machine of the class described including in combination a machine for affixing bails or handles upon cans and a machine for securing said bails permanently to said cans, said bail affixing machine having means therein for storing a plurality of said bails, and means for releasing and delivering one of said bails at a time to a reciprocally operated member for affixing said bail upon said can; said machine for securing said bail to said can having slidable means for holding the end of said bail in place and slidable means for twisting the ends of said bail, said twisting operation permanently securing said bail upon said can, and said bail affixing machine operating in timed relation with said bail securing machine aforesaid.

3. In a machine of the class described for affixing and securing bails to the cans or the like containers, said machine including in combination a machine for affixing said bails to the ears of said cans and a machine for permanently securing said bails to the ears of said cans, said bail affixing machine having means therein for delivering a bail at a time to a reciprocally operated member for affixing said bail upon said can; said bail including a pair of U-shaped bail ends having a rectangular positioned bent extension, said bent extension being inserted by said affixing machine into the openings of the can ear of said can; said machine for permanently securing said bail to the ears of said can including means for holding the ends of said bail in place, and slidable means for twisting the U-shaped portion of said bail end, said twisting of the U-shaped portion of said bail permanently securing said bail end to said can aforesaid.

4. In a machine for affixing prefabricated bails to cans in combination with a machine for permanently securing said bails to said cans, said affixing machine including slidably operated means for affixing the ends of said bails to the ears of said cans, said securing means having twistably operated means for permanently securing the ends of said bails to the ears of said cans, said affixing and said securing machine being operated simultaneous and in timed relation with each other.

THOMAS J. GORMAN, Jr.